(12) United States Patent
Lanzone et al.

(10) Patent No.: US 10,015,080 B2
(45) Date of Patent: Jul. 3, 2018

(54) TRAFFIC RECOVERY AT INTERWORKING NODES

(75) Inventors: Sergio Lanzone, Genoa (IT); Diego Sobrero, Genoa (IT); Orazio Toscano, Genova (IT)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 6 days.

(21) Appl. No.: 14/405,399

(22) PCT Filed: Jun. 28, 2012

(86) PCT No.: PCT/EP2012/062551
§ 371 (c)(1),
(2), (4) Date: Dec. 3, 2014

(87) PCT Pub. No.: WO2013/185848
PCT Pub. Date: Dec. 19, 2013

(65) Prior Publication Data
US 2015/0138953 A1    May 21, 2015

(30) Foreign Application Priority Data
Jun. 12, 2012 (EP) .................................. 12171598

(51) Int. Cl.
*G01R 31/08*  (2006.01)
*H04L 12/26*  (2006.01)
(Continued)

(52) U.S. Cl.
CPC .............. *H04L 45/22* (2013.01); *H04J 3/14* (2013.01); *H04J 3/1652* (2013.01); *H04L 49/55* (2013.01)

(58) Field of Classification Search
CPC .......... H04L 45/22; H03L 3/14; H04J 3/1652; H04J 3/1664; H04J 11/0026; H04J 11/005; H04J 14/0216
See application file for complete search history.

(56) References Cited

U.S. PATENT DOCUMENTS

| | | | |
|---|---|---|---|
| 7,245,582 B1 * | 7/2007 | Roberts | H04J 14/0227 370/217 |
| 7,656,823 B1 * | 2/2010 | Monga | H04L 41/12 370/255 |

(Continued)

OTHER PUBLICATIONS

PCT International Search Report, dated Nov. 6, 2012, in connection with International Application No. PCT/EP2012/062551, all pages.

*Primary Examiner* — Christopher Crutchfield
*Assistant Examiner* — Abu-Sayeed Haque
(74) *Attorney, Agent, or Firm* — Leffler Intellectual Property Law, PLLC (57) ABSTRACT

A boundary node for interworking between a first network and a second network comprises first equipment for interfacing with the first network and second equipment for interfacing with the second network. The first equipment comprises a switch fabric. A first interworking interface and a second interworking interface are provided for carrying traffic between the second equipment and the first equipment. Each of the interworking interfaces is for interfacing with a respective traffic-carrying path of the second network. For traffic flow in a direction from the second network to the first network, a method comprises determining that recovery switching is required for traffic on one of the traffic-carrying paths of the second network and performs a recovery switch, using the switch fabric in the first equipment, to switch between the interworking interfaces to achieve a recovery switch between the traffic-carrying paths of the second network.

14 Claims, 12 Drawing Sheets

(51) Int. Cl.
*H04J 3/16* (2006.01)
*H04L 12/28* (2006.01)
*H04L 12/707* (2013.01)
*H04L 12/939* (2013.01)
*H04J 3/14* (2006.01)

(56) References Cited

U.S. PATENT DOCUMENTS

| | | | | |
|---|---|---|---|---|
| 2003/0067648 | A1* | 4/2003 | Antosik | H04B 10/07 398/30 |
| 2008/0219268 | A1* | 9/2008 | Dennison | H04L 12/4625 370/395.2 |
| 2010/0271935 | A1* | 10/2010 | Allasia | H04L 12/433 370/222 |
| 2011/0066753 | A1* | 3/2011 | Wang | H04L 45/586 709/238 |
| 2012/0106948 | A1* | 5/2012 | Moynihan | H04J 3/1611 398/10 |
| 2012/0127855 | A1* | 5/2012 | Alon | H04L 12/413 370/218 |
| 2012/0281523 | A1* | 11/2012 | Huber | H04L 41/0663 370/217 |
| 2013/0011132 | A1* | 1/2013 | Blair | H04L 12/4641 398/2 |
| 2013/0039214 | A1* | 2/2013 | Yedavalli | H04L 45/025 370/254 |

* cited by examiner

Direction: client - OTN

Fig. 11

TRAFFIC RECOVERY AT INTERWORKING NODES

CROSS-REFERENCE TO RELATED APPLICATIONS

This application claims priority under 35 U.S.C. § 119 to European Patent Application No. 12171598.1, filed Jun. 12, 2012, which is hereby incorporated herein by reference in its entirety.

TECHNICAL FIELD

This invention relates to a way of performing traffic recovery, such as traffic protection, at a boundary node which interworks between two networks.

BACKGROUND

Figure 1:
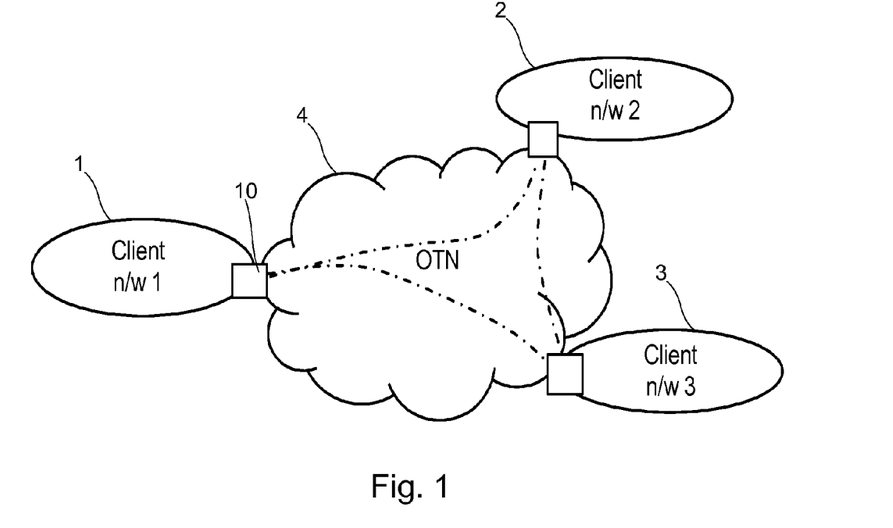
FIG. 1 shows an Optical Transport Network and client networks.

Nowadays, optical backbone networks are mainly based on International Telecommunications Union (ITU-T) G.709/G.798 standards, which define an Optical Transport Network (OTN). Such standards allow the transport of a range of different traffic technologies, such as Ethernet and Synchronous Optical Networking (SONET)/Synchronous Digital Hierarchy (SDH). Referring to FIG. 1, an OTN network 4 can be considered as a central cloud connecting peripheral/client networks 1,2,3, which can be based on different technologies. For example, a national optical backbone 4 can be used to connect peripheral regional SDH rings or Ethernet/MPLS sub-networks 1,2,3.

The boundary nodes 10 at the boundary between the OTN 4 and each of the client networks 1,2,3 map the client signals (e.g. STM-n/OC-n, GbE, 10GE, etc.) into Optical Channel Data Unit (ODUk) containers for transport within the OTN 4. Within the OTN 4, the traffic can be protected using standard ODUk Sub-Network Connection (SNC) protection as defined by ITU-T G.873.1.

Figure 2:
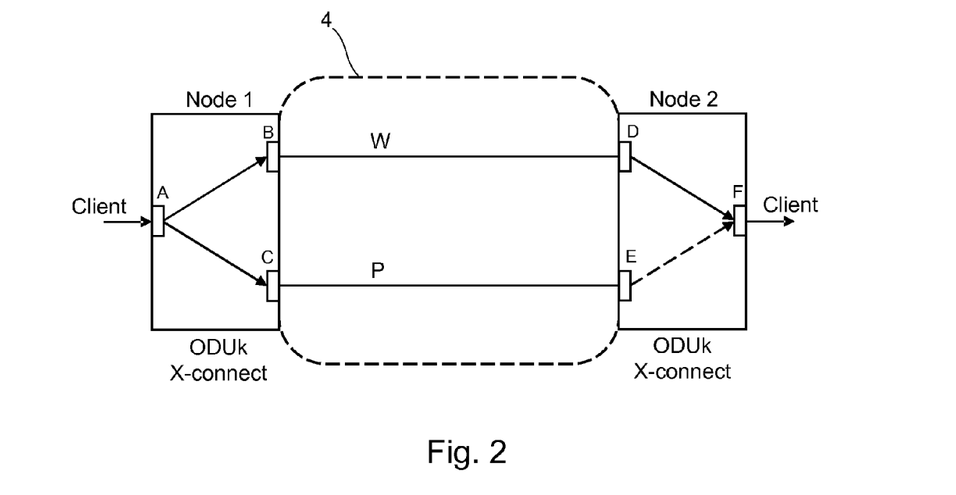
FIG. 2 shows a protection scheme which can be used to protect traffic within the Optical Transport Network of FIG. 1.

FIG. 2 shows ODUk SNC protection between two nodes, Node 1, Node 2, of an OTN 4. In one protection scheme, there is duplication of client traffic at Node 1, and the duplicated traffic is sent over two independent paths of the OTN Network 4. A first path (ABD) is called the "working" path and a second path (A→C→E) is called the "protecting path". The destination node, Node 2, will select the traffic (i.e. ODUk) either from the W path or from the P path depending on quality information. The quality information can be a Signal Fail SF or Signal Degrade SD detected by the traffic cards D and E at Node 2. There is OTN ODUk switching fabric in each of Node 1 and in Node 2.

Figure 3:
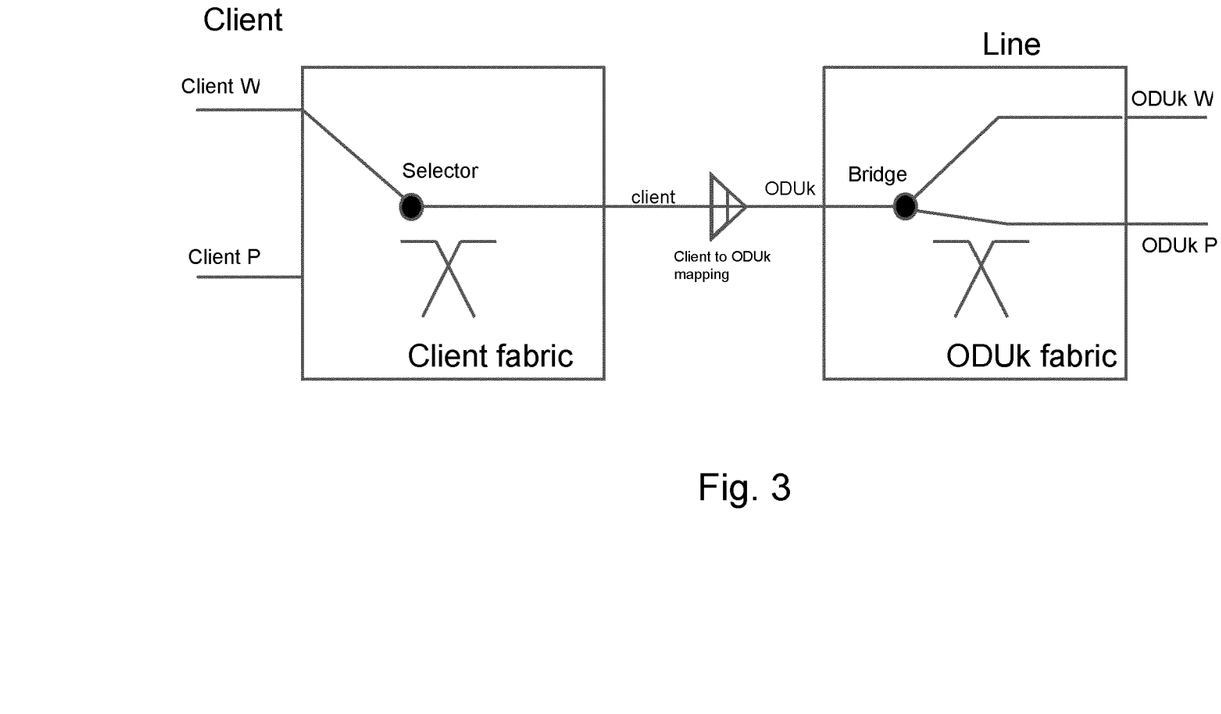
FIGS. 3 and 4 show a boundary node of the network of FIG. 1 with apparatus to provide protection of client traffic and apparatus to provide protection of OTN traffic.
Figure 4:
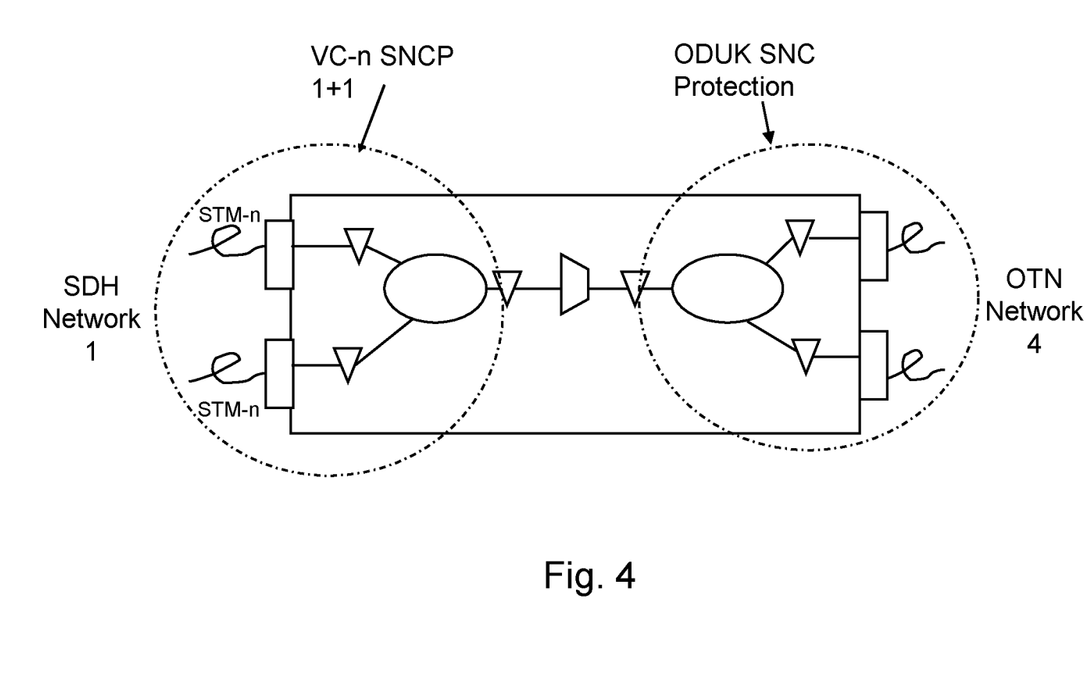

Each client network 1,2,3 connected to the OTN 4 has switching capability at the client layer, which can be used for the purpose of providing protection within the client network. A boundary node 10 can be provided with both a client network switching fabric (e.g. at the SDH VC-n layer) to close protections at the SDH layer and an OTN switching fabric (e.g. at the ODUk layer) to close protections at the OTN layer. An example of a node with two switching fabrics is shown in FIGS. 3 and 4. In FIG. 4, the client traffic is SDH. Starting from the left-hand side of FIG. 4, a VC-n Sub-Network Connection Protection (SNCP) is closed in the SDH fabric, then the result of the protection is mapped into an ODUk. An ODUk Sub-Network Protection is opened by the ODUk fabric of the node. This arrangement is effective, but it has a disadvantage of being expensive to implement because the node must be provided with two switching fabrics, one for the client network and one for the OTN.

SUMMARY

An aspect of the invention provides a method of performing traffic recovery at a boundary node for interworking between a first network and a second network. The node comprises first equipment for interfacing with the first network and second equipment for interfacing with the second network. The first equipment comprises a switch fabric. The node comprises a first interworking interface and a second interworking interface for carrying traffic between the second equipment and the first equipment. Each of the interworking interfaces is for interfacing with a respective traffic-carrying path of the second network. The method comprises, for traffic flow in a direction from the second network to the first network, determining that recovery switching is required for traffic on one of the traffic-carrying paths of the second network. The method further comprises performing a recovery switch, using the switch fabric in the first equipment, to switch between the interworking interfaces to achieve a recovery switch between the traffic-carrying paths of the second network.

An advantage of an embodiment of the invention is that it is possible to provide recovery/protection of traffic on the second network, without providing a recovery/protection switching function as part of the second (line-side) equipment. Instead, traffic recovery/protection is provided by the first (client-side) equipment. Recovery is "simulated" by the first (client-side) equipment. This has an advantage of saving the cost of providing a switching fabric in the second equipment, such as an ODUk switching fabric in a case where the second network is OTN.

The arrangement according to an embodiment of the invention is particularly useful in situations where the boundary node is provided at customer-located equipment (CLE) which connects a client's network to a server network. In these situations, the node may only interface to a small number of traffic-carrying paths of the second network and the requirement of a client-side switching fabric and a line-side switching fabric is prohibitively expensive.

Advantageously, the apparatus further comprises a third interworking interface and a fourth interworking interface for carrying traffic between the first equipment and the second equipment, wherein each of the interworking interfaces is for interfacing with a respective traffic-carrying path of the second network. In one alternative, the method can comprise, for traffic flow in a direction from the first network to the second network, receiving traffic from the first network and duplicating the received traffic over the third interworking interface and the fourth interworking interface. This alternative can be used to achieve 1+1 recovery/protection. In a second alternative, the method can comprise, for traffic flow in a direction from the first network to the second network, receiving traffic from the first network and forwarding the received traffic over one of the third and fourth interworking interfaces. The method further comprises determining that recovery switching is required for traffic on one of the traffic-carrying paths of the second network and using the switch fabric to switch between the interworking interfaces to achieve a recovery switch between the traffic-carrying paths of the second network. This alternative can be used to achieve 1:1 recovery/protection.

Advantageously, the step of determining that recovery switching is required comprises at least one of monitoring signaling received on one of the traffic-carrying paths and monitoring for defects in a signal received on one of the traffic-carrying paths.

Throughout this specification, the term "recovery" is intended to include "protection", which typically means that a backup path is preconfigured in advance of detecting any fault or failure, as well as "restoration", which typically means that signaling to configure a backup path occurs after detection of failure.

Another aspect of the invention provides apparatus for use at a boundary node for interworking between a first network and a second network. The apparatus comprises first equipment for interfacing with the first network. The first equipment comprises a switch fabric. The apparatus further comprises second equipment for interfacing with the second network. The apparatus further comprises a first interworking interface and a second interworking interface for carrying traffic between the second equipment and the first equipment, wherein each of the interworking interfaces is for interfacing with a respective traffic-carrying path of the second network. The apparatus further comprises control logic which is arranged to determine that recovery switching is required for traffic on one of the traffic-carrying paths of the second network. The control logic is further arranged to perform a recovery switch, using the switch fabric, to switch between the interworking interfaces to achieve a recovery switch between the traffic-carrying paths of the second network.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable medium can be a non-transitory medium. The machine-readable instructions can be downloaded to the storage medium via a network connection.

BRIEF DESCRIPTION OF THE DRAWINGS

Embodiments of the invention will be described, by way of example only, with reference to the accompanying drawings in which.

DETAILED DESCRIPTION

Referring again to FIG. 1, an OTN network 4 connects peripheral/client networks 1,2,3. The peripheral/client networks 1,2,3 can be based on the same, or different, technologies to the OTN 4, such as Ethernet and Synchronous Optical Networking (SONET)/Synchronous Digital Hierarchy (SDH). Boundary nodes 10 are provided for interworking between the networks.

Figure 5:
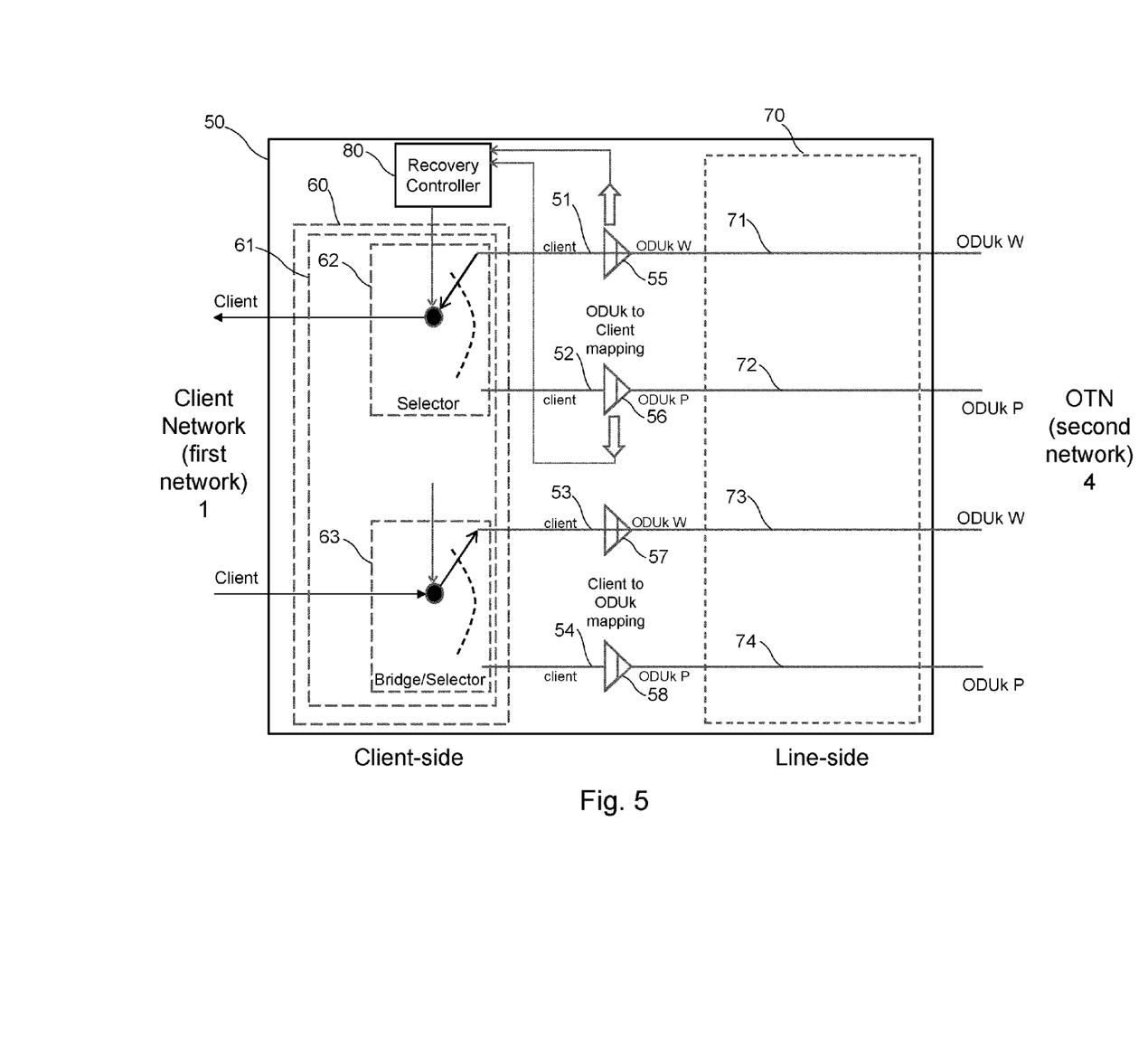
FIG. 5 shows apparatus for use at a boundary node, according to an embodiment of the invention.

FIG. 5 shows an embodiment of apparatus 50 for use at a boundary node 10 for interworking between a first network and a second network. In the embodiment shown in FIG. 5, the first network is a client network (e.g. 1, FIG. 1) and the second network is a server network based on the Optical Transport Network (OTN) 4.

The apparatus 50 generally comprises first equipment 60 for interfacing with the first network 1 and second equipment 70 for interfacing with the second network 4. In FIG. 5, the first equipment 60 will be described as client-side equipment, and the second equipment 70 will be described as line-side equipment. The first equipment 60 comprises a switch fabric 61. The switch fabric 61 comprises a recovery switching function 62 which is operable in the traffic direction OTN to client network (right-to-left in FIG. 5). The switch fabric 61 also comprises a switching function 63 which is operable in the traffic direction client network to OTN (left-to-right in FIG. 5). As will be described below, switching function 63 can be arranged to operate as a bridge or as a selector switch. When switching function 63 operates as a bridge, traffic received from the client network is duplicated onto multiple output interfaces. When switching function 63 operates as a switch, traffic received from the client network is switched to a selected output interface.

Apparatus 50 comprises a first interworking interface 51 and a second interworking interface 52. Each interface is for carrying traffic in the traffic direction between the second equipment 70 and the first equipment 60, i.e. OTN to client network in FIG. 5. Each of the interworking interfaces 51, 52 is for interfacing with a respective traffic-carrying path 71, 72 of the second network. A first 71 of the traffic-carrying paths is a working path, ODUk W, and the second 72 of the traffic-carrying paths is a protection path, ODUk P. A mapping function 55, 56 in each interworking interface 51, 52 de-maps traffic between a format/technology used in the second network (e.g. ODUk) and a format/technology used in the first network (e.g. SDH VC-n).

Apparatus 50 comprises a third interworking interface 53 and a fourth interworking interface 54. Each interface is for carrying traffic in the traffic direction between the first equipment 60 and the second equipment 70, i.e. client network to OTN in FIG. 5. Each of the interworking interfaces 53, 54 is for interfacing with a respective traffic-carrying path 73, 74 of the second network. A first 73 of the traffic-carrying paths is a working path, ODUk W, and the second 74 of the traffic-carrying paths is a protection path, ODUk P. A mapping function 57, 58 in each interworking interface 53, 54 maps traffic between a format/technology used in the first network (e.g. SDH VC-n) and a format/ technology used in the second network (e.g. ODUk). Control logic 80, which will be called a recovery controller, controls operation of the switching functions 62, 63. For the direction OTN to client network, the recovery controller 80 is arranged to determine that recovery switching is required for traffic on one of the traffic-carrying paths 71, 72 of the second network 4. Recovery controller 80 is arranged to perform a recovery switch, using the switch fabric 62, to switch between the interworking interfaces 51, 52 to achieve a recovery switch between the traffic-carrying paths 71, 72 of the second network 4. This avoids the need for recovery switching in the line-side equipment 70 of the apparatus 50. Recovery controller 80 can respond to control bits carried by ODUk W and/or ODUk P signals, such as Signal Fail (SF) and Signal Degrade (SD). Overhead data can be extracted by the mapping functions 55, 56 and forwarded to the recovery controller 80.

For the direction client network 1 to OTN 4, a client protection is opened. There are several possible schemes for operating in the client network to OTN direction.

One possible recovery scheme is called 1+1. For a 1+1 recovery scheme, client traffic is simultaneously sent over both the ODUk W and ODUk P paths. Client traffic received from the client network 1, at first equipment 60, is bridged by switching function 63. Duplicate traffic is forwarded over interfaces 53 and 54. Client to ODUk mapping 57, 58 maps the client traffic into ODUk containers and forwards the ODUk containers to second equipment 70. The ODUk W and ODUk P signals are sent over respective paths of the OTN 4. The two ODUk signals shall simulate the ODUk W and the ODUk P of an ODUk SNC. For example, the ODUk OH bytes, of the two ODUks, such as Path trace, Tandem Connection Monitoring (TCM) and General Communication Channel (GCC) shall be configured in the same way as if the ODUk W and ODUk P signals had been generated by a traffic recovery/protection function of the second equipment 70. In this way, the apparatus 50 simulates ODUk recovery using the client-side fabric 60. The mapping function 53, 54 generates the ODUk according to G.709 specification. As the two ODUk signals are built from the same client signal, they will automatically be generated with the same value. To simulate a single ODUk that is bridged on to two paths, mapping functions 53 and 54 insert the same overhead information in the overhead bytes.

Another possible recovery scheme is called 1:1. For a 1:1 recovery scheme, client traffic is initially sent over the ODUk W path. When a fault occurs, traffic is switched to the ODUk P path. Extra traffic may use the ODUk P path during the period when it is not required as a back-up path for ODUk W path. Client traffic received from the client network 1, at first equipment 60, is switched by switching function 63 to interface 53. Client to ODUk mapping 57 maps the client traffic into ODUk containers and forwards the ODUk containers to second equipment 70. The ODUk W signal is sent over the OTN 4. In the event that a fault occurs, or any other situation occurs which requires traffic to be switched to an alternative path, recovery controller 80 controls switch 63 to switch client traffic to interface 54. Client to ODUk mapping 58 maps the client traffic into ODUk containers and forwards the ODUk containers to second equipment 70. The ODUk P signal is sent over the OTN 4. Traffic may be returned to the ODUk W path when the network fault is rectified. In that case, recovery controller 80 controls switch 63 to switch traffic to interface 53. Alternatively, traffic may remain on the ODUk P path. As in the 1+1 recovery scheme, apparatus 50 simulates ODUk recovery using the client-side fabric 60.

Figure 6A:
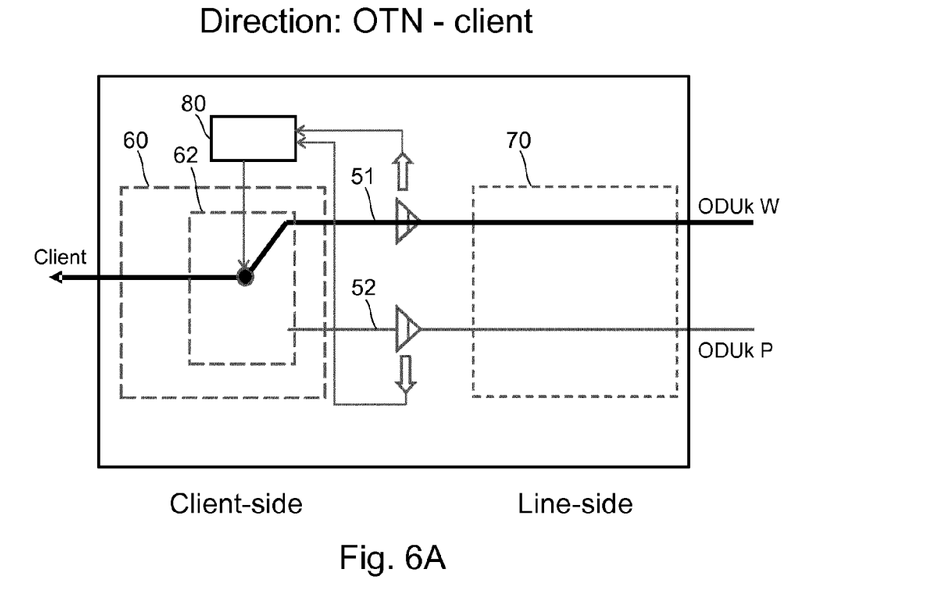
FIGS. 6A and 6B show operation of the apparatus of FIG. 7 in one of the traffic directions.
Figure 6B:
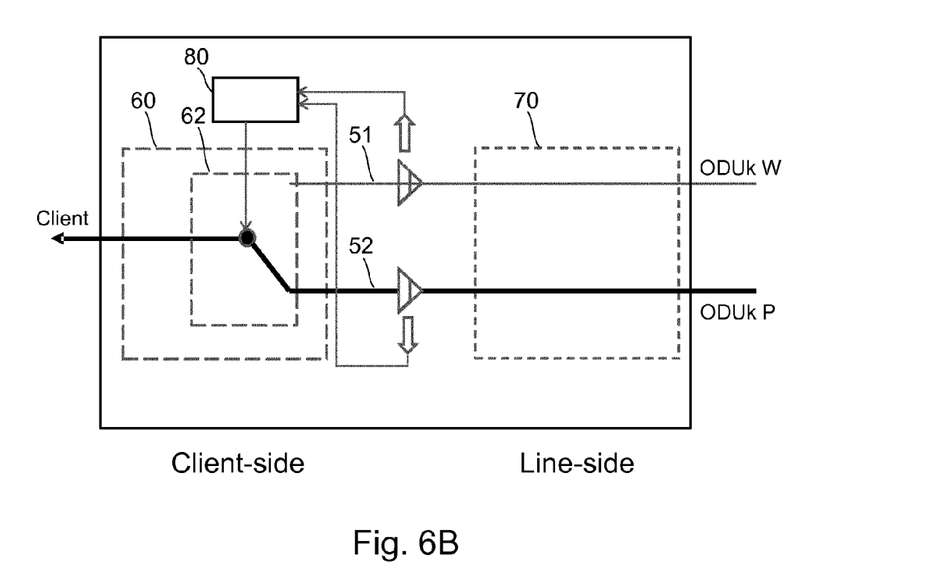

FIGS. 6A and 6B show operation of apparatus 50 at the boundary 10 in the direction OTN to client network. In a 1+1 recovery scheme, traffic is received at line-side equipment 70 on the ODUk W path and on the ODUk P path. Each path connects to a respective interface 51, 52. Switch 62 of the client-side equipment 60 connects a signal received on one of the interfaces 51, 52 to the client network. Switch 62 is controlled by recovery controller 80. Recovery controller 80 can respond to defects detected on the ODUk W or P paths. If defects are detected on the W path, but the P path is OK, switch 62 is controlled to select the P path. In FIG. 6A, traffic is received at line-side equipment 70 on the ODUk W path, forwarded over interface 51, and switched by switch 62 of the client-side equipment 60 to the client network. In FIG. 6B, traffic is received at line-side equipment 70 on the ODUk P path, forwarded over interface 52, and switched by switch 62 of the client-side equipment 60 to the client network. Switching operation is similar for a 1:1 recovery scheme. For a 1:1 recovery scheme, the recovery controller 80 typically responds to signaling carried over the ODUk W or P paths which indicates when a switch to a different path is required. In a 1:1 with extra traffic recovery scheme, the ODUk P path may be used to carry other traffic at times when the path is not required for protection purposes. Traffic may be received on the ODUk P path and interface 52 in the FIG. 6A scenario, and the received traffic is forwarded by switch 62 to another client interface (i.e. not the protected interface). In FIGS. 6A and 6B, interfaces 51, 52 may map the signals from OTN format to a format used by the client network.

Figure 7A:
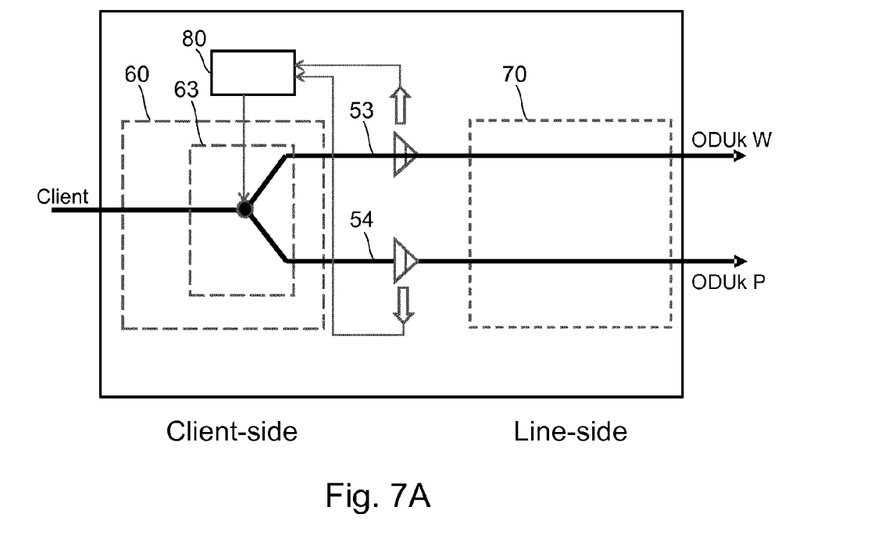
FIGS. 7A to 7C show operation of the apparatus of FIG. 7 in the other traffic direction.
Figure 7B:
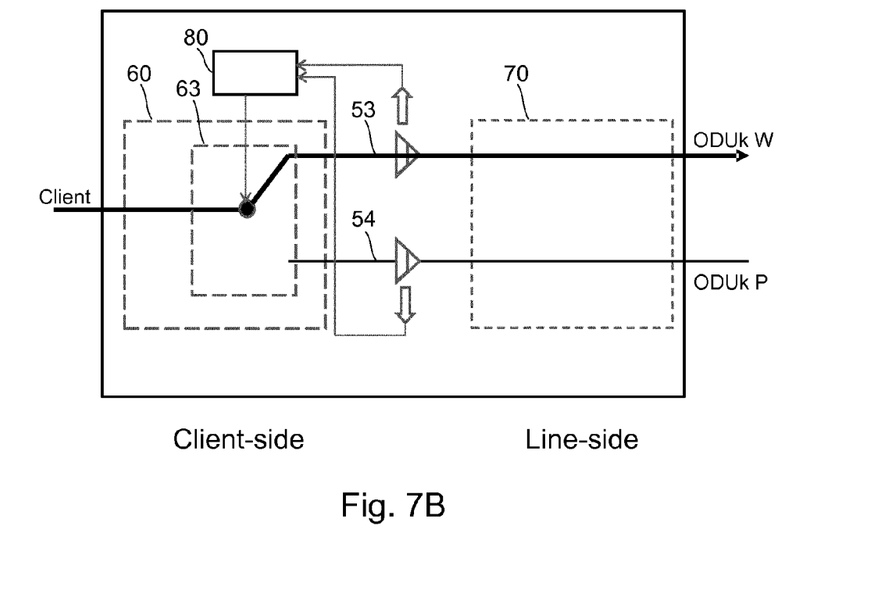
Figure 7C:
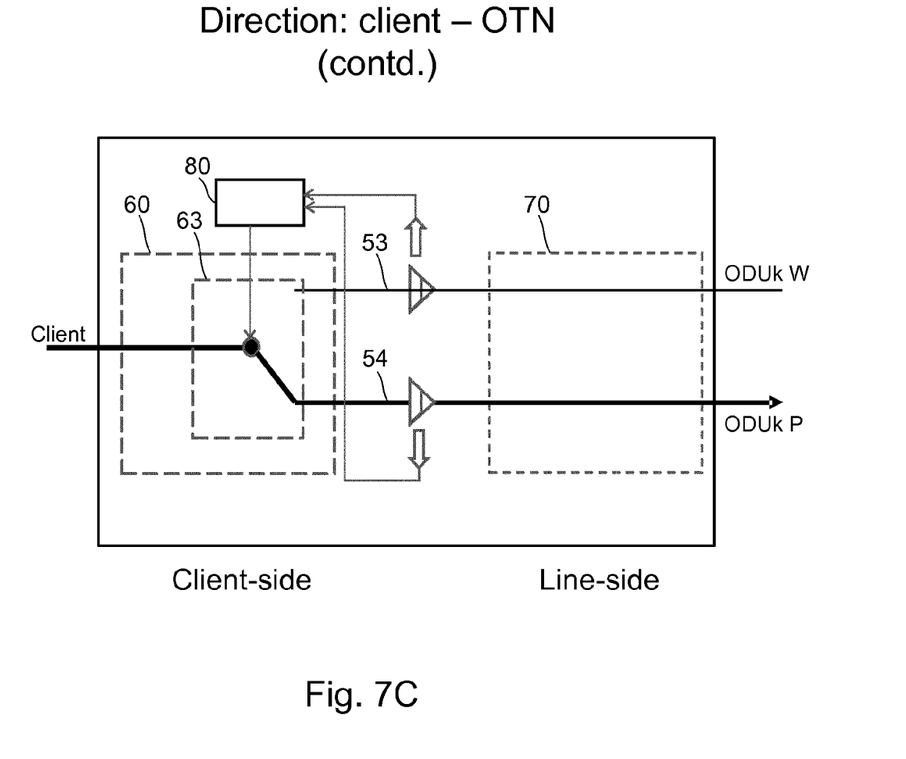

FIGS. 7A to 7C show operation of apparatus 50 at the boundary 10 in the direction client network to OTN. FIG. 7A shows operation for a 1+1 recovery scheme. Client traffic is received at client-side equipment 60 and forwarded by switch 63 (operating as a bridge) over interfaces 53 and 54. Each interface 53, 54 connects with a respective path ODUk W, ODUk P of the OTN. Switch 62 is controlled by recovery controller 80. FIGS. 7B and 7C show operation for a 1:1 recovery scheme. In FIG. 7B, client traffic is received at client-side equipment 60 and forwarded by switch 63 over interface 53. Interface 53 connects with an ODUk W path. In FIG. 7C, client traffic is received at client-side equipment 60 and forwarded by switch 63 over interface 54. Interface 54 connects with an ODUk P path. Switch 62 is controlled by recovery controller 80. In FIGS. 7A to 7C interfaces 53, 54 map the signals from a format used by the client network to OTN format.

Typically, it is expected that a need to perform a recovery/protection switch will be driven by the occurrence of a fault on one of the paths ODUk W, ODUk P. A decision to perform a recovery/protection switch can be based on signaling received in overhead data on one of the paths, or signaling received from a remote node. A decision to perform a recovery/protection switch can additionally, or alternatively, be based on detected defects, e.g. Loss Of Signal (LOS). For example, consider a bidirectional protection between node A and B. Consider node B detects a failure on the working path in direction A-B and switches to protection path P. Node B can also request node A to switch to protection path P in the direction B-A even if the working path, in that direction, is not at fault. This bidirectional behaviour can be achieved via Automatic Protection Switching (APS) signaling that is carried by the ODUk overhead data. A further option is that a network operator can instruct a node to perform a protection switch even if W and P are both good.

The apparatus provided at another boundary node 10 can also provide recovery/protection switching as part of the client-side equipment, or it can provide recovery/protection switching as part of the server-side equipment in a conventional manner. An advantage of embodiments of the invention is that it does not require any special modifications to apparatus/operating methods at other nodes.

Figure 8:
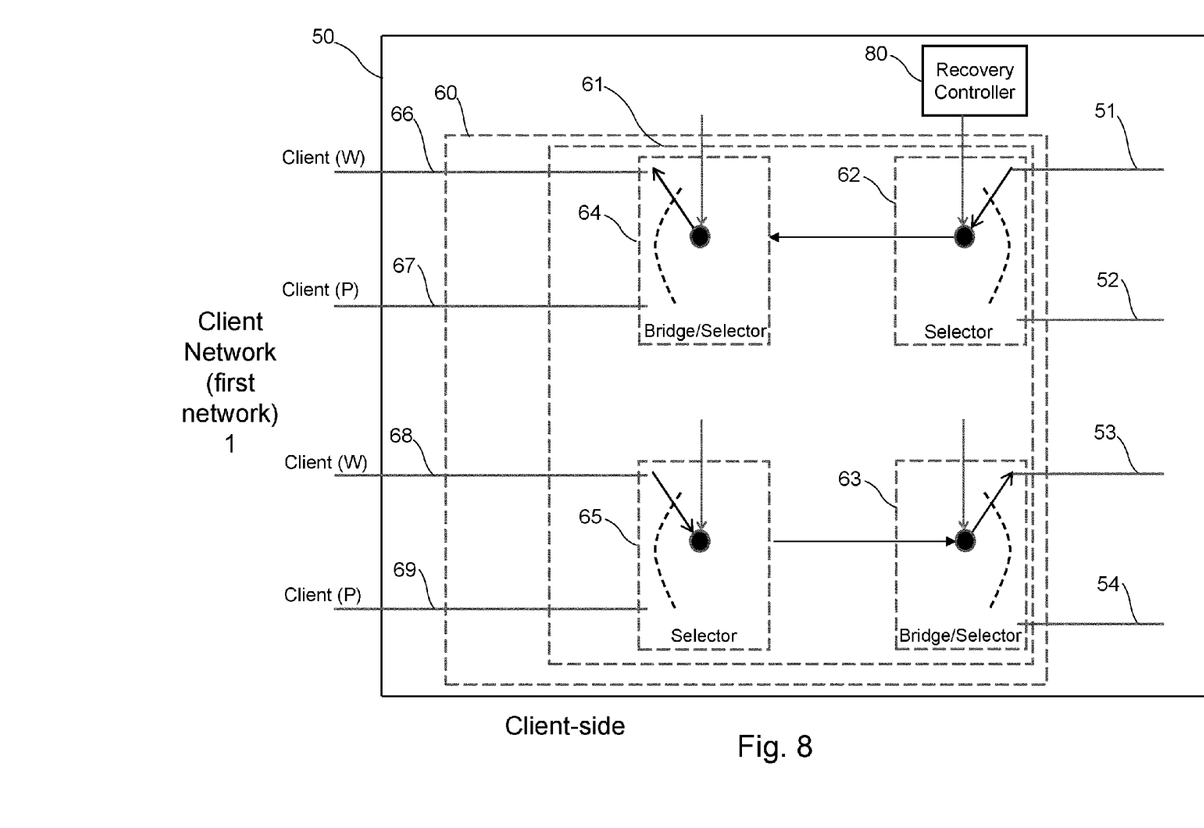
FIG. 8 shows apparatus which also supports recovery within the client network.

In any of the embodiments, the first (client-side) equipment 60 can also provide recovery/protection switching for the first (client) network 1. FIG. 8 shows the client-side part of an apparatus 50 which supports recovery/protection in the client network 1. Firstly, apparatus for the traffic direction ingressing to the client network 1 will be described. An output of the switching function 62, which is provided for line-side recovery, is applied to an additional switching function 64. Switching function 64 can be operated as a bridge or as a selector and connects to a pair of client interfaces 66, 67 which are used as a working path (Client (W)) and a recovery/protection path (Client (P)). Next, apparatus for the traffic direction egressing from the client network 1 will be described. A pair of client interfaces 68, 69 are used as a working path (Client (W)) and a recovery/protection path (Client (P)). These client interfaces 68, 69 connect to an additional switching function 65 which is provided for recovery/protection within the client network 1. Switching function 65 can connect one of client interfaces 68, 69 to switch 63. Recovery controller 80 controls operation of the switching functions 63, 64, and can respond to signaling received on one of the client interfaces, or signaling received from another node of the client network 1. Additionally, or alternatively, recovery controller 80 can respond to detected defects.

In the embodiments shown in FIGS. 5 to 8 the first network 1 is a client network and the second network 4 is a server network, such as an OTN. The client-side equipment 60 provides a recovery switching function for the server network. In other embodiments, the roles can be reversed, with the server-side equipment 70 providing a recovery switching function for the client network. In any of FIGS. 5 to 8, the apparatus essentially remains the same, but the "first network" is now the server network and the "second network" is the client network. As before, interworking interfaces provide mapping, if required, between different formats used on the two networks.

In any of the embodiments, the recovery/protection path may be a path which is pre-configured in advance of detecting any fault or failure. This is usually referred to as "protection". However, the invention can also be applied to traffic restoration, which typically means that signaling to configure a backup path occurs after detection of failure.

Figure 9A:
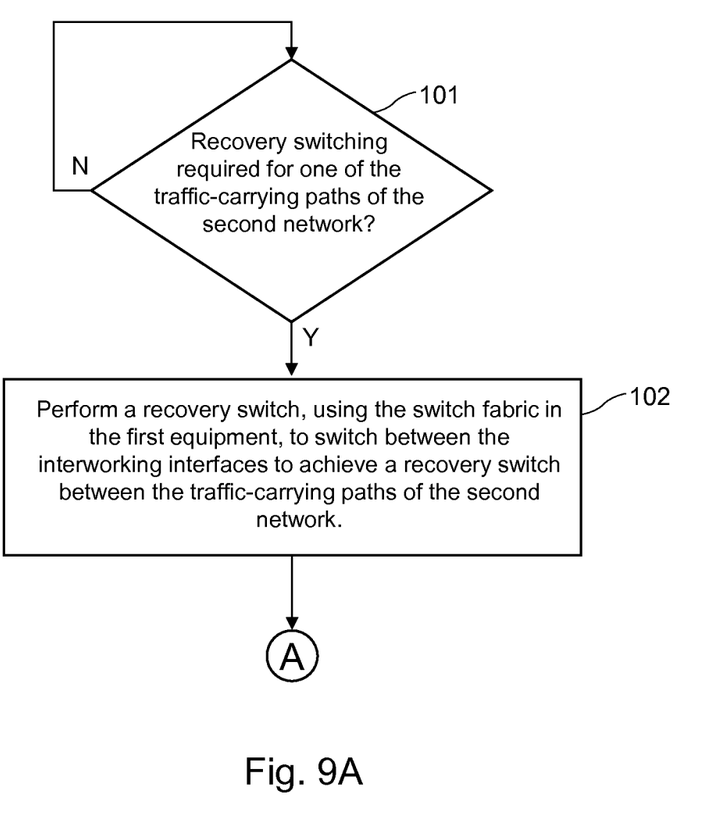
FIGS. 9A to 9C show methods of operating the apparatus at a boundary node.
Figure 9B:
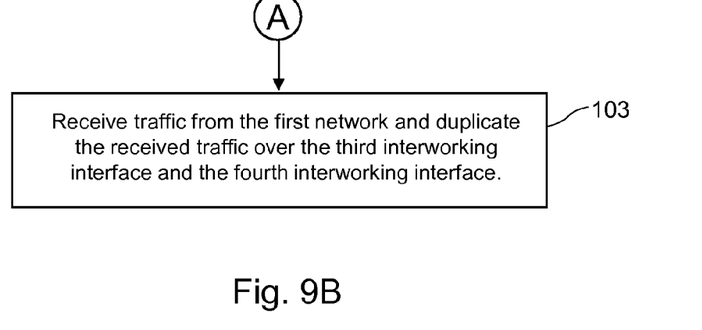
Figure 9C:
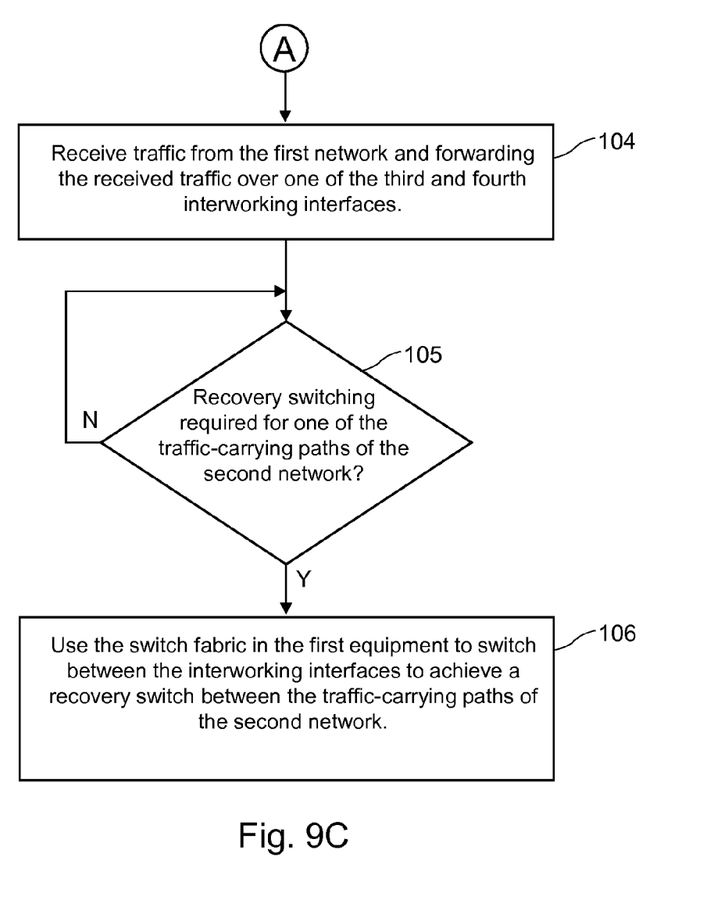

FIGS. 9A to 9C show methods of operating the apparatus 50 at a boundary node. The method of FIG. 9A begins at step 101 by determining that recovery switching is required for traffic on one of the traffic-carrying paths of the second network. Step 101 can comprise monitoring signaling received on one of the traffic-carrying paths. Alternatively, step 101 can comprise receiving signaling from a remote node indicating that a recovery switch is required. At step 102 the method performs a recovery switch, using the switch fabric in the first equipment, to switch between the interworking interfaces to achieve a recovery switch between the traffic-carrying paths of the second network. The method can also perform the steps shown in FIG. 9B or 9C, which relate to operation in the other traffic direction. Although the flowchart shows the steps of FIGS. 9B/9C occurring after the steps of FIG. 9A, the sequence is not important. At least one of the steps of FIGS. 9B/9C can occur before any of the steps of FIG. 9A, or the steps of FIGS. 9B/9C can occur at the same time as the steps of FIG. 9A. Referring to FIG. 9B, step 103 receives traffic from the first network and duplicates the received traffic over the third interworking interface and the fourth interworking interface. Referring to FIG. 9C, step 104 receives traffic from the first network and forwarding the received traffic over one of the third and fourth interworking interfaces. Step 105 determines that recovery switching is required for traffic on one of the traffic-carrying paths of the second network. Step 105 can comprise monitoring signaling received on one of the traffic-carrying paths. Alternatively, step 105 can comprise receiving signaling from a remote node indicating that a recovery switch is required. Step 106 uses the switch fabric to switch between the interworking interfaces to achieve a recovery switch between the traffic-carrying paths of the second network.

Figure 10:
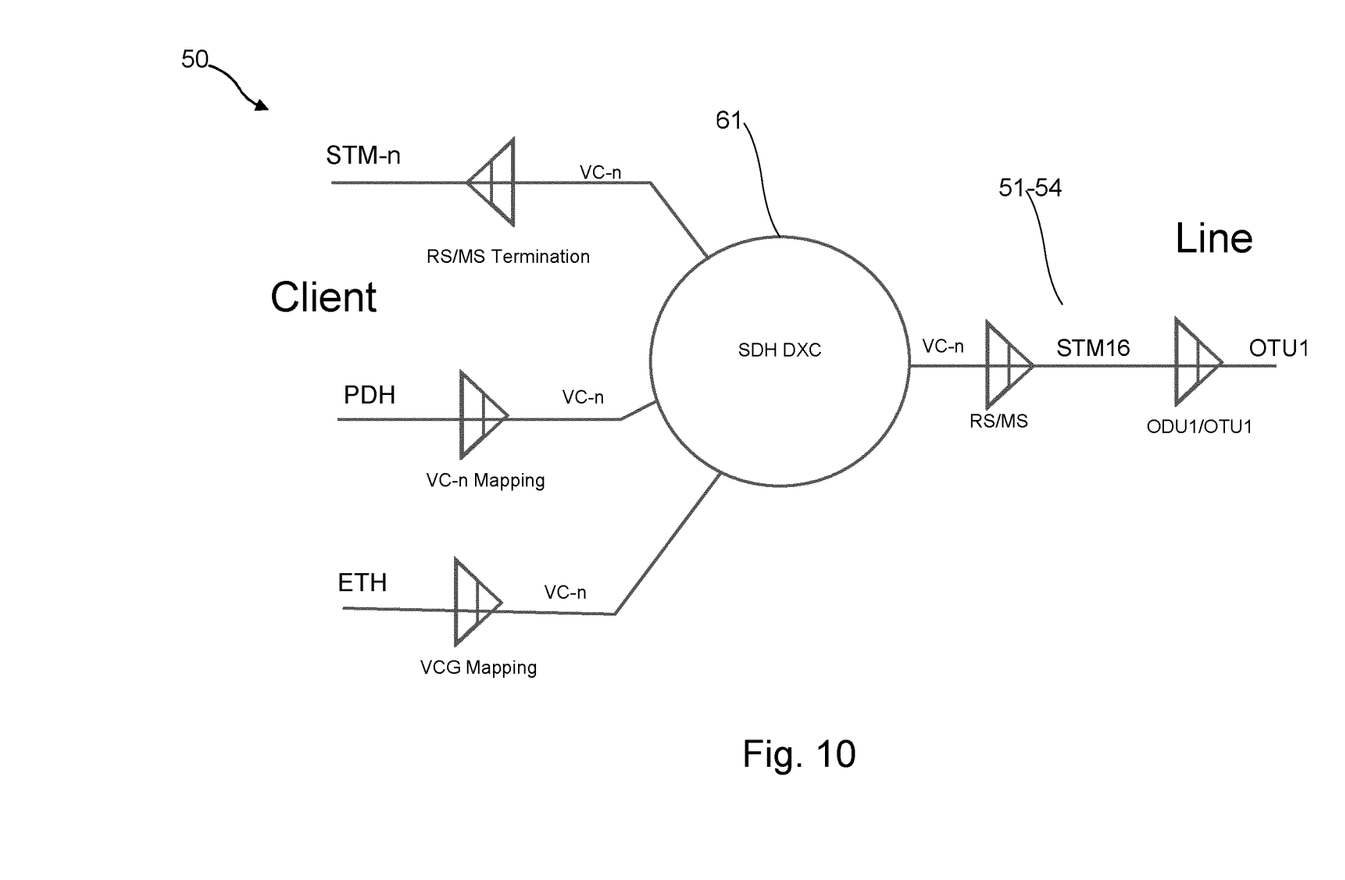
FIG. 10 shows further detail of a boundary node with supports multiple traffic technologies.

FIG. 10 shows apparatus 50 at a boundary node 10 which supports multiple client traffic technologies: SDH, PDH, Ethernet. The client-side switch fabric 61 is a cross-connect which operates on SDH Virtual Containers (VC-n). Client traffic of non-SDH technologies (PDH, ETH) is first mapped into SDH form. The interworking interfaces 51-54 which connect the client-side equipment and the line-side equipment map to a higher-order SDH format (STM16) and then to OTN formats (ODU/OTU).

Figure 11:
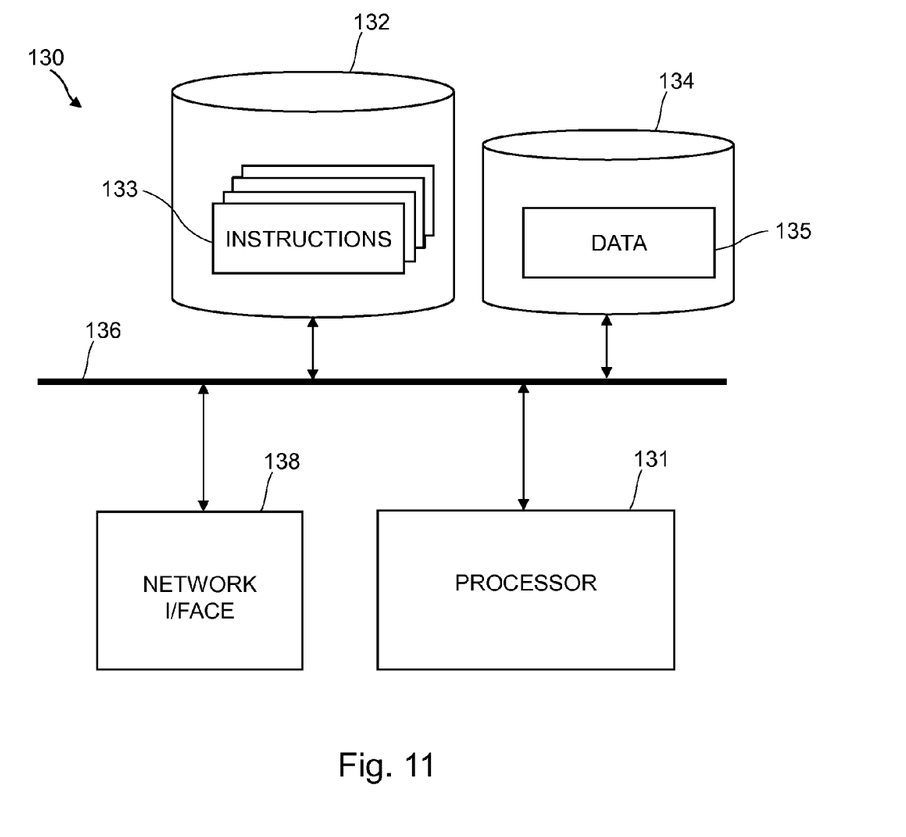
FIG. 11 shows processing apparatus for a computer-based implementation of the method.

FIG. 11 shows an exemplary processing apparatus 130 which may be implemented as any form of a computing and/or electronic device, and in which embodiments of the system and methods described above may be implemented. In particular, the protection controller 80 may be implemented using processing apparatus 130. Processing apparatus may implement the method shown in any of FIGS. 9A to 9C. Processing apparatus 130 comprises one or more processors 131 which may be microprocessors, controllers or any other suitable type of processors for executing instructions to control the operation of the device. The processor 131 is connected to other components of the device via one or more buses 136. Processor-executable instructions 133 may be provided using any computer-readable media, such as memory 132. The processor-executable instructions 133 can comprise instructions for implementing the functionality of the described methods. The memory 132 is of any suitable type such as read-only memory (ROM), random access memory (RAM), a storage device of any type such as a magnetic or optical storage device. Additional memory 134 can be provided to store data 135 used by the processor 131. The processing apparatus 130 comprises one or more network interfaces 138 for interfacing with other network entities, such as other nodes 10 of the network 4.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of performing traffic recovery at a boundary node for interworking between a first network and a second network, the boundary node comprising first equipment for interfacing with the first network, second equipment for interfacing with the second network, a first interworking interface for carrying traffic between the second equipment and the first equipment, and a second interworking interface for carrying traffic between the second equipment and the first equipment, wherein the first equipment comprises a switch fabric, and wherein each of the interworking interfaces is for interfacing with a respective traffic-carrying path of the second network, the method comprising, for traffic flow in a direction from the second network to the first network:

determining that recovery switching is required for traffic on one of the traffic-carrying paths of the second network;

wherein the first interworking interface and the second interworking interface carry traffic in a same direction as one another between the second equipment and the first equipment, and wherein the method further comprises:

performing a recovery switch by operating the switch fabric in the first equipment to switch from use of one of the first and second interworking interfaces to use of a different one of the first and second interworking interfaces in order to achieve a recovery switch between the traffic-carrying paths of the second network, wherein the first network uses a first transport technology and the second network uses a second transport technology, and the switch fabric is arranged to switch traffic of the first transport technology, and the method further comprises:

mapping, at the interworking interfaces, traffic between a transport technology used on the first network and a transport technology used on the second network.

2. A method according to claim 1 wherein the apparatus further comprises a third interworking interface and a fourth interworking interface for carrying traffic between the first equipment and the second equipment, wherein each of the interworking interfaces is for interfacing with a respective traffic-carrying path of the second network, the method comprising, for traffic flow in a direction from the first network to the second network:

receiving traffic from the first network; and duplicating the received traffic over the third interworking interface and the fourth interworking interface.

3. A method according to claim 1 wherein the apparatus further comprises a third interworking interface and a fourth interworking interface for carrying traffic between the first equipment and the second equipment, wherein each of the interworking interfaces is for interfacing with a respective traffic-carrying path of the second network, the method comprising, for traffic flow in a direction from the first network to the second network:

receiving traffic from the first network and forwarding the received traffic over one of the third and fourth interworking interfaces;

determining that recovery switching is required for traffic on one of the traffic-carrying paths of the second network; and using the switch fabric to switch between the interworking interfaces to achieve a recovery switch between the traffic-carrying paths of the second network.

4. A method according to claim 1, wherein the step of determining that recovery switching is required comprises at least one of monitoring signalling received on one of the traffic-carrying paths and monitoring for defects in a signal received on one of the traffic-carrying paths.

5. A method according to claim 1, wherein the step of determining that recovery switching is required comprises receiving signalling from a remote node indicating that a recovery switch is required.

6. A method according to claim 1, wherein the traffic-carrying paths are a working path and a protection path.

7. A method according to claim 1, wherein the first network is one of a client network and a server network and the second network is the other of the client network and the server network.

8. A method according to claim 1, wherein the first transport technology is one of: Synchronous Digital Hierarchy, Ethernet and the second transport technology is Optical Transport Network.

9. An apparatus for use at a boundary node for interworking between a first network and a second network, the apparatus comprising:

first equipment for interfacing with the first network, the first equipment comprising a switch fabric;

second equipment for interfacing with the second network;

a first interworking interface and a second interworking interface for carrying traffic between the second equipment and the first equipment, wherein each of the interworking interfaces is for interfacing with a respective traffic-carrying path of the second network, and wherein the first interworking interface and the second interworking interface carry traffic in a same direction as one another between the second equipment and the first equipment; and control logic which is arranged to:

determine that recovery switching is required for traffic on one of the traffic-carrying paths of the second network; and perform a recovery switch by operating the switch fabric of the first equipment to switch from use of one of the first and second interworking interfaces to use of a different one of the first and second interworking interfaces in order to achieve a recovery switch between the traffic-carrying paths of the second network, wherein the first network uses a first transport technology and the second network uses a second transport technology, and the switch fabric is arranged to switch traffic of the first transport technology.

10. The apparatus according to claim 9 further comprising:

a third interworking interface and a fourth interworking interface for carrying traffic between the first equipment and the second equipment, wherein each of the interworking interfaces is for interfacing with a respective traffic-carrying path of the second network; and wherein the switch fabric is arranged to receive traffic from the first network and duplicate the received traffic over the third interworking interface and the fourth interworking interface.

11. The apparatus according to claim 9 further comprising:

a third interworking interface and a fourth interworking interface for carrying traffic between the first equipment and the second equipment, wherein each of the interworking interfaces is for interfacing with a respective traffic-carrying path of the second network, wherein the switch fabric is arranged to receive traffic from the first network and forward the received traffic over one of the third and fourth interworking interfaces, and wherein the control logic is arranged to determine that recovery switching is required for traffic on one of the traffic-carrying paths of the second network and use the switch fabric to switch between the interworking interfaces to achieve a recovery switch between the traffic-carrying paths of the second network.

12. The apparatus according to claim 9 wherein the first network is one of a client network and a server network and the second network is the other of the client network and the server network.

13. A communications system comprising:
   a first network;
   a second network; and
   the apparatus according to claim 9 at a boundary node for interworking between the first network and the second network.

14. A non-transitory machine-readable medium carrying instructions which, when executed by a processor, cause the processor to perform a method of performing traffic recovery at a boundary node for interworking between a first network and a second network, the boundary node comprising first equipment for interfacing with the first network, second equipment for interfacing with the second network, a first interworking interface for carrying traffic between the second equipment and the first equipment, and a second interworking interface for carrying traffic between the second equipment and the first equipment, wherein the first equipment comprises a switch fabric, and wherein each of the interworking interfaces is for interfacing with a respective traffic-carrying path of the second network, the method comprising, for traffic flow in a direction from the second network to the first network:
   determining that recovery switching is required for traffic on one of the traffic-carrying paths of the second network;
   wherein the first interworking interface and the second interworking interface carry traffic in a same direction as one another between the second equipment and the first equipment, and
   wherein the method further comprises:
   performing a recovery switch by operating the switch fabric in the first equipment to switch from use of one of the first and second interworking interfaces to use of a different one of the first and second interworking interfaces in order to achieve a recovery switch between the traffic-carrying paths of the second network,
   wherein the first network uses a first transport technology and the second network uses a second transport technology, and the switch fabric is arranged to switch traffic of the first transport technology, and the method further comprises:
   mapping, at the interworking interfaces, traffic between a transport technology used on the first network and a transport technology used on the second network.

* * * * *